United States Patent Office 3,494,561
Patented Feb. 10, 1970

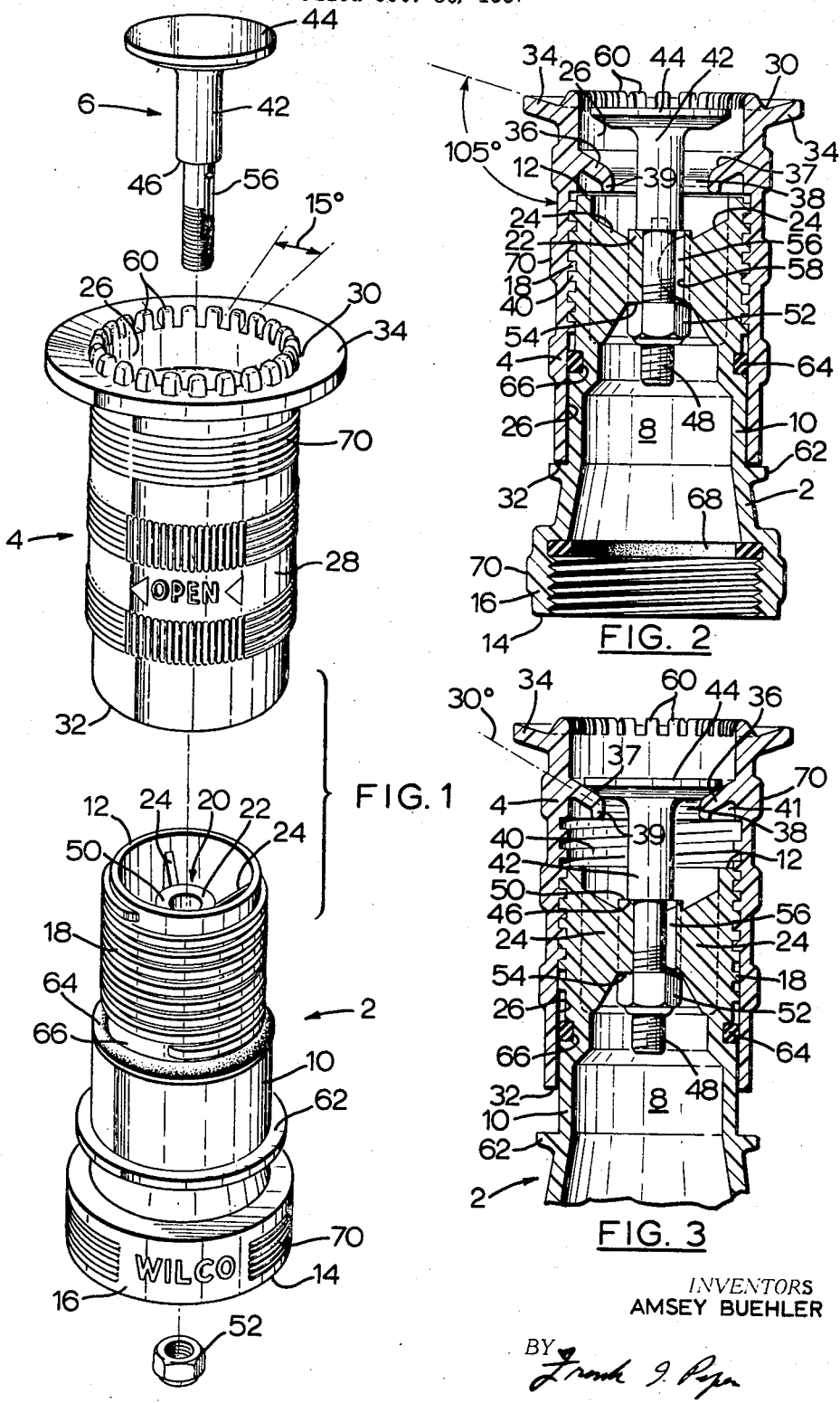

3,494,561
FIRE HOSE NOZZLE
Amsey Buehler, Cobourg, Ontario, Canada, assignor to Wilson & Cousins Co., Limited, Toronto, Ontario, Canada, a company
Filed Oct. 30, 1967, Ser. No. 679,008
Int. Cl. B05b 1/32, 1/26
U.S. Cl. 239—458                                              7 Claims

ABSTRACT OF THE DISCLOSURE

A hose nozzle including a generally cylindrical sleeve with an annular baffle seat member extending inwardly from the inner surface thereof and a body member axially adjustable within the sleeve and with a baffle plate fixed therein in co-axial relationship. The baffle plate and corresponding baffle seat define an annular opening through which water is discharged and which is adjustable in size by relative axial movement of the sleeve and body member. The baffle seat member is formed with a bevelled annular seat for the baffle plate on the outlet side of the nozzle and, on the inlet side, with an annular groove coaxial with the sleeve. The particular configuration of the baffle seat member and especially the annular groove on the inlet side enable the discharge of an exceptionally coherent straight stream of water from the nozzle.

---

The present invention relates to a nozzle for fire hoses and the like and refers more particularly to a nozzle of the type whereby water under pressure may be expelled from a hose either as a solid straight stream or as a finely dispersed spray or fog.

Nozzles which serve this purpose are well known. One such known nozzle comprises a body portion having a male thread in its outer surface at its outlet end and a sleeve portion with a female thread in its inner surface. A baffle member comprising a generally cylindrical shaft with a disc-like baffle plate at one end is firmly secured with its shaft in a baffle housing provided in the body portion of the nozzle. The baffle plate of the baffle member co-operates with an annular baffle plate seat provided at or near the outlet end of the sleeve to form a circular nozzle outlet through which the water leaves. By relative rotation of the sleeve and the body, the relative axial positions of the sleeve and the body are adjusted and, since the baffle member is secured to the body, the separation between the baffle plate and the baffle seat is varied by such rotation. It is this adjustment of the distance between the baffle plate and the baffle seat which is responsible for determining whether the water is emitted from the nozzle as a solid straight stream or in the form of a finely dispersed spray or fog.

The present invention is based on the surprising discovery that a fire hose nozzle of the type hereinbefore described will pass a straight stream of water having improved coherence if the baffle seat member is formed such that it extends inwardly from the inner surface of the sleeve to define a bevelled annular seat for the baffle plate on the outlet side and, on the inlet side, an annular groove coaxial with the sleeve.

More specifically, the present invention provides a hose nozzle comprising:

(a) A hollow cylindrical body having inner and outer surfaces and outlet and inlet ends and provided with:
(i) a male thread in the outer surface of the outlet portion of said body, and (ii) a baffle housing disposed within said body coaxially therewith and secured to said inner surface of said body;

(b) A hollow cylindrical sleeve having inner and outer surfaces and outlet and inlet ends and provided with:
(i) an annular member near said outlet end extending inwardly from said inner surface of said sleeve to define a bevelled annular baffle seat on the outlet side of said sleeve and, on the inlet side, and annular groove coaxial with said sleeve, and (ii) a female thread in the inner surface of said sleeve, said female thread being disposed between said annular groove and inlet end of said sleeve; and (c) A baffle member comprising a shaft portion having at its upper end a disc-like baffle plate having a diameter greater than the circular aperture defined by said annular baffle seat, said female thread of said sleeve and said male thread of said body being adapted to secure said body and said sleeve together so that their relative axial positions can be adjusted by relative rotation of said sleeve and said body, and said baffle member being adapted to be secured against axial movement with its shaft portion disposed within said baffle housing of said body and with said baffle plate disposed on the outlet side of said annular baffle seat of said sleeve whereby, on relative rotation of said body and said sleeve, the separation of said baffle plate and said annular baffle seat is varied.

It will be appreciated that a fire hose nozzle in accordance with the present invention will be adapted to be secured to a fire hose fitting, for instance, by the provision of a female-threaded skirt at the inlet end of the body for securing the nozzle to a male-threaded hose fitting.

Although applicants do not wish to be restricted to any theroretical considerations as to why the nozzles in accordance with the invention give a more coherent water flow when passing a straight stream of water, it is believed that the configuration of the baffle seat member and particularly the provision of the annular groove on its inlet side results in the formation of a collar of circulating water in the zone adjacent the groove and that such collar of water may serve to define the peripheral boundary of the water stream passing through the nozzle outlet with greater definity than was possible in previously known nozzles in which the boundary is defined by parts of the nozzles per se.

It is found that maximum coherence for the straight stream of water passing out of the nozzle outlet is obtained when the baffle seat member is of uniform thickness and projects inwardly away from the outlet at an included angle of about 30° to the inner surface of the sleeve and has an axially extending lip at its inner edge which defines the annular groove.

Although the baffle housing in the hollow cylindrical body can be constructed in any convenient manner, it has proven particularly satisfactory to use a baffle housing comprising a hollow elongated member secured to the inner surface of the body by a plurality of radial web members. By having the lower edge surfaces of these radial web members extend from the elongated member radially outwardly and downwardly to the inner surface of the body, turbulence in the stream is reduced thereby producing a farther reaching solid straight stream which holds together for a longer distance without the stream breaking apart.

In accordance with a preferred feature of the invention, the sleeve is additionally provided with a flange projecting radially outwardly from its upper end and, in accordance with yet another preferred feature, the upper end of the sleeve projects upwardly beyond such a flange as a plurality of circumferentially spaced teeth adapted to diffuse a stream of water passing through the nozzle into a finely dispersed spray when the sleeve and body are suitably disposed with respect to each other by adjustment of their relative axial positions. Particularly satisfactory results have been obtained when the aforementioned flange projects outwardly from the upper end of the sleeve at an angle of about 105° to the outer surface of the sleeve.

The nozzles of the present invention can be manufactured from any suitable material and, in view of their relative simple construction, they can be moulded from an impact-resistant thermoplastic resin provided of course that such material has sufficient strength to withstand the stresses which the nozzle will undergo in use, in particular the water pressures which can be as high as 1000 p.s.i. One particularly suitable thermoplastic resin which can be used in the nozzles of the invention is impact-resistant polycarbonate resin. When the nozzles are formed of such a material, they can be manufactured by a simple moulding technique. Further advantages resulting from the use of a polycarbonate resin are that the need for time-consuming machining operations is avoided and, in view of the relatively low thermal conductivity of such a resin, the nozzles are more easily handled by the operators in very cold weather.

The invention will now be described in greater detail merely by way of illustration with reference to the accompanying drawing in which:

FIGURE 1 is an exploded perspective view of a fire hose nozzle according to the invention;

FIGURE 2 is a vertical cross-section along the central axis of the nozzle of FIGURE 1 with the nozzle in its fully open or wide spray angle position; and FIGURE 3 is a similar cross-section to FIGURE 2 with the nozzle in its fully closed position.

The fire hose nozzle shown in the drawings comprises a hollow cylindrical body generally indicated at 2, a hollow cylindrical sleeve generally indicated at 4 and a baffle member generally indicated at 6.

It will be seen that the hollow cylindrical body 2 has an inner surface 8, an outer surface 10, an outlet end 12 and an inlet end 14. At the inlet end 14 of the hollow cylindrical body 2, there is provided a female-threaded skirt 16 for securing the nozzle to a male-threaded hose fitting (not shown). A male thread 18 is provided in the outer surface 10 of the body 2 and this thread extends downwardly from the outlet end 12 of the body 2. The body 2 also contains a baffle housing 20, generally indicated in FIGURE 1, comprising a hollow elongated member 22 disposed within the body 2 co-axially therewith and secured to the inner surface 8 of the body 2 by four web members 24. It will be noted that the lower edge surfaces of these web members 24 extend radially outwardly and downwardly to the inner surface 8 of the body 2.

The hollow cylindrical sleeve 4 has an inner surface 26, an outer surface 28, an outlet end 30 and an inlet end 32. A flange 34 projects outwardly from the outlet end 30 of the sleeve 4. Sleeve 4 is also provided with an annular baffle seat member 36 of substantially uniform thickness which extends inwardly from the inner surface 26 of the sleeve 4 to define an annular baffle plate seat and a circular aperture 38 both of which are co-axial with the sleeve 4. Annular member 36 has an axially extending lip 39 which, together with member 36 and sleeve surface 26, defines annular groove 41. The sleeve 4 is provided on its inner surface 26 with a female thread 40 adapted to engage the male thread 18 of the body 2. The thread 40 is disposed between the annular baffle seat member 36 and the lower end 32 of the sleeve 4. It should, however, be noted that the thread 40 does not need to extend upwardly as far as the annular baffle seat member 36.

The baffle member 6 comprises a generally cylindrical shaft 42 and, at its upper end, a disc-like baffle plate 44.

It will be seen from FIGURES 2 and 3 that, when the body 2, the sleeve 4 and the baffle member 6 are fitted together, the male thread 18 of the body 2 and the female thread 40 of the sleeve 4 engage together so that the relative axial positions of the body 2 and the sleeve 4 can be adjusted by relative rotation of the sleeve 4 and the body 2. It will further be seen that the shaft portion 42 of the baffle member 6 is disposed within the hollow elongated member 22 of the baffle housing 20 with the baffle plate 44 disposed on the outlet side of the annular baffle plate seat 37, the separation of the baffle plate 44 and the annular baffle seat 37 being varied on relative rotation of the body 2 and the sleeve 4. The precise manner in which the baffle member 44 is secured to the body 2 will be explained in greater detail hereinafter.

It will, however, at this stage, be appreciated that, by relative rotation of the body 2 and the sleeve 4, the separation of the baffle plate 44 and the annular baffle seat 37 can be varied from the completely open position shown in FIGURE 2 to the fully closed position shown in FIGURE 3.

The baffle member 6 is secured within the baffle housing 20 against axial movement and, in the embodiment illustrated, this is effected by the provision of a lip 46 and a threaded portion 48 on the cylindrical shaft 42 of the baffle member. To secure the baffle member in position the baffle housing 20 of the body 2, the shaft 42 is inserted into the hollow elongated member 22 until the lip 46 abuts the upper edge 50 of the hollow elongated member 22. A nut 52 is then threaded on to the lower end of the shaft 42 until it abuts the lower edge 54 of the hollow elongated member 22. In order to prevent rotation of the baffle member 6 and accidental unscrewing of the nut 52, a key 56 is splined into the shaft 42 of the baffle member and this key 56 engages a groove 58 (see FIGURE 2) in the elongated member 22 to prevent rotation of the baffle member 6.

As previously stated, the outlet end of the sleeve 4 preferably extends beyond the flange 34 as a plurality of circumferentially spaced teeth 60 adapted in only the completely open position shown in FIGURE 2 to diffuse a stream of water passing through the nozzle into a finely dispersed spray. This preferred construction is shown in the accompanying drawings from which it will be seen that teeth 60 are provided around the outlet end 30 of sleeve 4 and that each of these teeth is hexagonal in horizontal section and has a generally curved upper surface. A total of twenty-four teeth at 15° intervals are provided.

It will be further seen from FIGURES 2 and 3 that the flange 34 preferably projects outwardly and upwardly from the upper end of the sleeve 4 at an angle of about 105° to the outer surface 28 of the sleeve 4 and that the annular baffle seat 37 preferably projects inwardly and downwardly from the inner surface 26 of the sleeve 4 at an angle of about 30° to that inner surface.

In the nozzle shown in the drawings, the lowest limit of axial movement of the sleeve 4 along the body 2 is determined by the abutment of the lower end 32 of the sleeve 4 with a radially outwardly projecting lip 62 provided on the outer surface 10 of the body 2 (see FIGURE 2). The uppermost limit of axial movement of the sleeve along body 2 is determined by the abutment of the lower surface of baffle plate 44 with the annular seat 37 of the member 36 (see FIGURE 3).

In order to prevent leakage between the sleeve 4 and the body 2, an O-ring 64, preferably of neoprene or the like, is located in a peripheral recess 66 provided at the lower end of the male thread 18 of the body 2. A neoprene washer 68 is provided in a recess at the upper end of the female-threaded skirt 16 to prevent leakage when the nozzle is connected to a male-threaded hose fitting.

Although the nozzles of the present invention can be formed from any suitable material, particularly effective results have been obtained by the use of polycarbonate resins for the manufacture of the sleeve 4 and the body 2. Such a material has the advantage of possessing adequate strength as well as having a low weight and low thermal conductivity and being readily mouldable thereby facilitating the manufacture of the nozzles with the required configuration without time-consuming and expensive casting and machining operations as are required if the nozzle is made from a metal such as brass. By way of example, a nozzle was moulded from the polycarbonate resin marketed under the registered trademark "Lexan" by Canadian General Electric Company Limited, Toronto, Canada. The baffle member for such a nozzle was of machined brass. On testing, the nozzle was found to be fully operational at temperatures as low as −40° F. and as high as 300° F. The nozzle was capable of withstanding a hydrostatic pressure of 1000 p.s.i. without leakage at the nozzle outlet in the fully closed position and had such a strength that it was undamaged by the repeated application of a 500 lb. load to the sleeve 4. In all tests concerning the flow characteristics, a highly coherent and "solid" stream of water with very little spray was obtained with the baffle plate at straight stream settings.

A further advantage which results from manufacturing the nozzles by moulding from a thermoplastic resin such as a polycarbonate resin is that knurled gripping surfaces 70 and embossed or indented indications 72 of the opening and closing directions of rotation can be moulded during the manufacturing operation into the outer surface 28 of the sleeve 4 and the outer surface 10 of the body 2.

The nozzle shown in the drawings can, as previously explained, be adjusted from the fully closed position of FIGURE 3 to the fully open position of FIGURE 2 by relative rotation of the sleeve 4 and the body 2. With the sleeve 4 and the body 2 in the fully open disposition shown in FIGURE 2, the widest possible angle of finely dispersed spray or fog is obtained. The construction of the teeth 60 in combination with the flange 34 causes part of the stream of water to be deflected into the centre to form a conical spray pattern which is substantially constant for varying pressures in the hose line and a desirable discharge angle of 90° is obtained. The water stream breaks up into fine particles to form a desirable denser fire-quenching spray.

What I claim as new and desire to protect by Letters Patent of the United States is:

1. A hose nozzle comprising:
   (a) a hollow cylindrical body having inner and outer surfaces and outlet and inlet ends, said body adapted to be secured to a fire hose fitting and provided with:
      (i) a male thread in the outer surface at the outlet end of the said body, and
      (ii) a baffle housing disposed within said body coaxially therewith and secured to said inner surface of said body,
   (b) a hollow cylindrical sleeve having inner and outer surfaces and outlet and inlet ends and provided with:
      (i) an annular member near said outlet end extending inwardly from said inner surface of said sleeve to define a bevelled annular baffle seat on the outlet side of said sleeve and, on the inlet side, an annular groove coaxial with said sleeve, said annular member being of uniform thickness and projecting inwardly from said inner surface of said sleeve at an included angle of about 30° to said inner surface and having an axially extending lip which defines the inner edge of said annular groove, and
      (ii) a female thread in the inner surface of said sleeve, said female thread being disposed between said annular groove and said inlet end of said sleeve, and
   (c) a baffle member comprising a shaft portion having at its upper end a disc-like baffle plate having a diameter greater than the circular aperture defined by said annular baffle seat, said female thread of said sleeve and said male thread of said body being adapted to secure said body and said sleeve together so that their relative axial positions can be adjusted by relative rotation of said sleeve and said body, and said baffle member being adapted to be secured against axial movement with its shaft portion disposed within said baffle housing of said body and with said baffle plate disposed on the outlet side of said annular baffle seat of said sleeve whereby, on relative rotation of said body and said sleeve, the separation of said baffle plate and said annular baffle seat is varied.

2. A fire hose nozzle as claimed in claim 1 in which said baffle housing comprises a hollow elongated member secured to said inner surface of said body by a plurality of radial web members, the inlet side edge surfaces of which extend from said elongated member radially outwardly and towards the inlet end of said body.

3. A first hose nozzle as claimed in claim 2 in which said sleeve is additionally provided with a flange projecting radially outwardly from its upper end.

4. A fire hose nozzle as claimed in claim 3 in which said flange projects outwardly and upwardly from said upper end of said sleeve at an angle of about 105° to said outer surface of said sleeve.

5. A first hose nozzle as claimed in claim 4 in which said upper end of said sleeve projects upwardly beyond said flange as a plurality of circumferentially spaced teeth adapted to diffuse a stream of water passing through said nozzle into a finely dispersed spray.

6. A fire hose nozzle as claimed in claim 1 in which said body and said sleeve are moulded from an impact-resistant polycarbonate resin.

7. A first hose nozzle as claimed in claim 3 in which said body and said sleeve are moulded from an impact-resistant polycarbonate resin.

References Cited

UNITED STATES PATENTS

| | | | |
|---|---|---|---|
| 3,058,670 | 10/1962 | Marotto et al. | 239—458 X |
| 3,150,829 | 9/1964 | Specht et al. | 239—458 X |

FOREIGN PATENTS 1,440,014  4/1966  France.

M. HENSON WOOD, JR., Primary Examiner

M. Y. MAR, Assistant Examiner

U.S. Cl. X.R.

239—460, 498, 579